United States Patent
Morea et al.

(10) Patent No.: US 11,795,341 B2
(45) Date of Patent: Oct. 24, 2023

(54) PROTECTIVE COATING FOR WOOD PRODUCTS AND METHOD OF MAKING SAME

(71) Applicant: Potters Industries, LLC, Wilmington, DE (US)

(72) Inventors: Gemma Morea, Knutsford (GB); Gonçalo Rosa Grilo, Saint-Pourçain sur Sioule (FR)

(73) Assignee: Potters Industries, LLC, Wilmington, DE (US)

( * ) Notice: Subject to any disclaimer, the term of this patent is extended or adjusted under 35 U.S.C. 154(b) by 76 days.

(21) Appl. No.: 16/949,454

(22) Filed: Oct. 29, 2020

(65) Prior Publication Data

US 2022/0135824 A1  May 5, 2022

(51) Int. Cl.
| | |
|---|---|
| C09D 15/00 | (2006.01) |
| C09D 7/61 | (2018.01) |
| C09D 7/65 | (2018.01) |
| C09D 7/45 | (2018.01) |
| C09D 133/04 | (2006.01) |

(52) U.S. Cl.
CPC ............... *C09D 15/00* (2013.01); *C09D 7/45* (2018.01); *C09D 7/61* (2018.01); *C09D 7/65* (2018.01); *C09D 133/04* (2013.01)

(58) Field of Classification Search
CPC ......... C09D 7/61; C09D 15/00; C09D 17/004
See application file for complete search history.

(56) References Cited

U.S. PATENT DOCUMENTS

| | | | | |
|---|---|---|---|---|
| 4,450,304 A | * | 5/1984 | Diery ............... | C08G 65/04 516/DIG. 1 |
| 5,672,200 A | * | 9/1997 | Heinz ............... | A61K 8/025 106/31.64 |
| 8,506,849 B2 | * | 8/2013 | Li ..................... | H01B 1/22 427/532 |
| 9,017,781 B2 | * | 4/2015 | O'Brien ........... | C08K 7/28 428/34.4 |
| 2018/0258319 A1 | * | 9/2018 | Akutsu ............. | C09G 1/06 |

FOREIGN PATENT DOCUMENTS

| | | | | |
|---|---|---|---|---|
| CN | 107459894 A | * | 12/2017 | |
| CN | 113767154 A | * | 12/2021 | ........... C09D 11/102 |
| DE | 4304491 A1 | | 8/1994 | |
| EP | 2223966 A1 | | 9/2010 | |
| WO | 2009156275 A1 | | 12/2009 | |
| WO | 2014005753 A1 | | 1/2014 | |
| WO | 2015112966 A1 | | 7/2015 | |
| WO | 2019055128 A1 | | 3/2019 | |

OTHER PUBLICATIONS

Machine translation of CN 113767154 A, published Dec. 7, 2021.*
European Search Report for Application No. 21205503.2 dated Apr. 22, 2022.

* cited by examiner

*Primary Examiner* — Vickey Nerangis
(74) *Attorney, Agent, or Firm* — Buchanan Ingersoll & Rooney PC (57) ABSTRACT

The present invention is a coating containing approximately 10% glass beads used to protect wood products. Applicant has discovered that the best performance occurs when the concentration of glass beads in the coating ranges from 5 wt % to 10 wt %. A shelf-stable paste is first prepared by combining a solution of modified styrene maleic acid copolymer and a synthetic layered silicate. That paste is then mixed with a binder to form the coating. Preferably, the concentration of glass beads in the paste ranges from 60 wt % to 80 wt %, the concentration of solution of modified styrene maleic acid copolymer ranges from 20 wt % to 25 wt % and the concentration of synthetic layered silicate ranges from 1 wt % to 3 wt %.

7 Claims, 8 Drawing Sheets
(8 of 8 Drawing Sheet(s) Filed in Color)

PROTECTIVE COATING FOR WOOD PRODUCTS AND METHOD OF MAKING SAME

BACKGROUND OF THE INVENTION

Field of the Invention

The present invention relates to the field of coatings and more particularly to protective coatings for wood products.

Background of the Related Art

Wood products, especially furniture and paneling, are often coated to provide wear, scratch and stain resistance properties to the wood product. These coatings are designed to minimize discoloring of the wood and to provide a generally smooth finish to the touch. Typical coatings include a binder, waxes, matting agents, defoaming agents and solvents.

Some coatings for wood products use plastic pellets as a filler. Because the plastic pellets have a similar density to the rest of the coating constituents, the plastic pellets remain in suspension. However, the wear, scratch, and stain resistance of such coatings is not as strong as desired. There is a need for an improved coating for wood products that provides enhanced wear, scratch, and stain resistance properties.

It has been desired to use glass beads, also known as solid glass microspheres, in coatings for wood products. Such glass beads are expected to provide wear and scratch resistance properties to the coating. However, because the density for the glass beads is much greater than that of the rest of the coating, the glass beads are unable to remain in solution for a normal shelf-life time period. The glass beads separate out of solution and fall to the bottom of the container. In order for glass beads to be successfully used in coatings for wood products, the glass beads must be able to remain in solution for a typical shelf-life time period.

There is a desire in the industry for the use of glass beads in wood coatings, but heretofore there has not been a successful implantation of such a coating.

The present invention is directed toward overcoming one or more of the above-identified problems.

BRIEF SUMMARY OF THE INVENTION

There has been an interest in providing glass beads in coatings for wood products. However, the beads tend to sink and segregate due to density difference between the beads and the rest of the coating and sink to the bottom of the container, rendering the composition unsuitable to be sold or used. Accordingly, in order for glass beads to be used in wood coatings, there is a need to improve the suspension stability of the coating formulations.

The inventors have found that glass beads and a binder to form a coating for wood products. Preferably, the coating contains between 5 wt % and 15 wt % glass beads, and more preferably 10 wt % glass beads.

The inventors have also found that a finished product can be formed having a wood product and a coating formed from glass beads and a binder.

The inventors have also found a paste that can be used in producing a coating for wood products, the paste formed from glass beads, a solution of modified styrene maleic acid copolymer, and a synthetic layered silicate. Preferably, the paste includes from 60 wt % to 80 wt % glass beads, from 20 wt % to 25 wt % solution of modified styrene maleic acid copolymer, and from 1 wt % to 3 wt % synthetic layered silicate. The paste can further include an anti-foam agent.

The inventors have also found a process for forming a coating for wood products in which a paste is formed from glass beads, a solution of modified styrene maleic acid copolymer, and synthetic layered silicate. The paste is mixed with a binder to form the coating.

Applicant has discovered that in order to maintain shelf stability of the coating, the glass beads should be pre-dispersed in a paste or slurry which maintains the beads in solution without settling. In the presently preferred process, a paste is formed containing glass beads, a solution of modified styrene maleic acid copolymer, and a synthetic-layered silicate. Preferably, the concentration of glass beads ranges from 60 wt % to 80 wt %, the concentration of solution of modified styrene maleic acid copolymer ranges from 20 wt % to 25 wt % and the concentration of synthetic layered silicate ranges from 1 wt % to 3 wt %. Applicant has discovered that when the paste is incorporated with a binder to form the coating, the paste will prevent the glass beads from settling out of solution.

In order to form the coating, the paste can be mixed with a suitable binder. The relative proportions of the paste and binder should be calculated to provide a resultant coating having approximately 10 wt % glass beads. Applicant has discovered that such a coating provides a desirable level of scratch and stain resistance.

Applicant has found that providing between 5 wt % and 15 wt % glass beads in the coating composition provides optimal scratch, wear and stain resistance properties to the coating. Applicant has found that there are little to no improvements in scratch, wear and stain resistance when the glass beads are below 5 wt %. Performance remains unchanged when the glass beads exceed 15 wt %.

Further features, aspects, objects, advantages, and possible applications of the present invention will become apparent from a study of the exemplary embodiments and examples described below, in combination with the Figures, and the appended claims.

BRIEF DESCRIPTION OF THE FIGURES

The patent or application file contains at least one drawing executed in color. Copies of this patent or patent application publication with color drawing(s) will be provided by the Office upon request and payment of the necessary fee.

The above and other objects, aspects, features, advantages and possible applications of the present invention will be more apparent from the following more particular description thereof, presented in conjunction with the following drawings, in which.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

The present invention is a coating especially suitable for wood products that provides desirable levels of scratch, wear and stain resistance to the coating. The coating includes a binder and contains between 5 wt % and 15 wt % glass beads or solid glass microspheres, and preferably 10 wt % glass beads or solid glass microspheres.

The glass beads or solid glass microspheres are typically less than 5 microns (Dv50). Suitable beads include those sold under the brands Spheriglass® or Omicron®.

Suitable binders include generally used wood coatings such as acrylic resins, amino resins, alkyl resins, epoxy resins, urethane resins, nitrocellulose and UV-hardened acrylate resins.

The use of glass beads in wood coatings provides numerous benefits. The addition of glass beads has a measurable matting efficiency. Adding glass beads provides a gloss at 60 degrees and glossat 85 degrees reduction, leading to an increased matting effect.

Example 1

Figure 1:
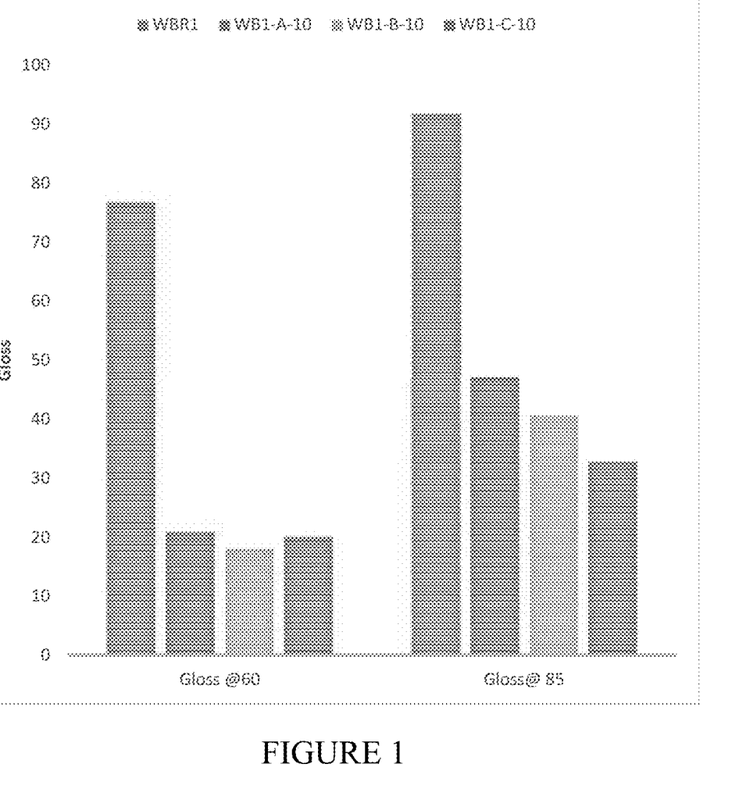
FIG. 1 is a bar graph showing the effect of the reduction in gloss @ 60 degrees and gloss @ 85 degrees as spherical beads are added to the wood coating.

As shown in FIG. 1, coating samples having no added beads (Sample WBR1) show higher gloss than samples having up to 10 wt % added beads (Samples WB1-A-10, WB1-B-10, and WB1-C-10).

Figure 2:
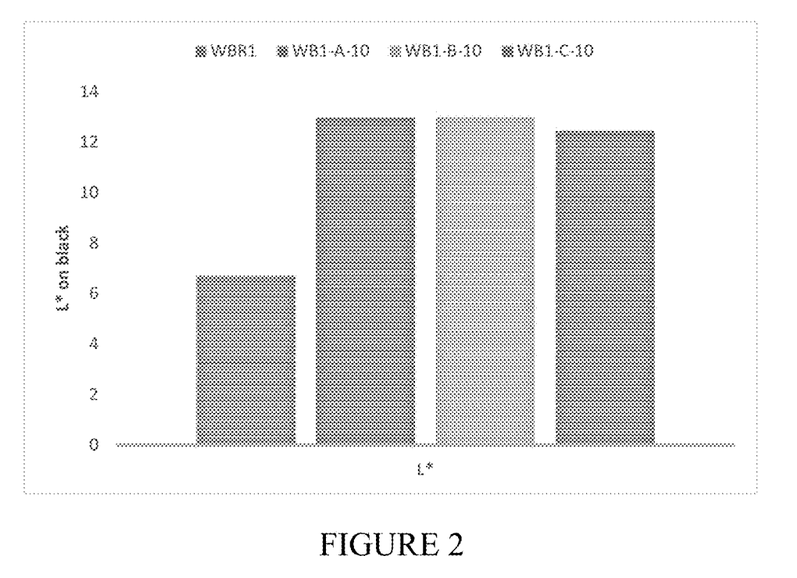
FIG. 2 is a bar graph showing the effect on transparency as spherical beads are added to the wood coating.

The addition of glass beads has a minimal effect on coating transparency. FIG. 2 shows the results of tests to determine the L* value for film transparency for coatings with added beads (Samples WB1-A-10, WB1-B-10, and WB1-C-10) and without added beads (Sample WBR1). Samples having a lower L* value have a higher film transparency. Although the addition of glass beads raises the L* value of the coating, the effect is minimal and the underlying wood can still be seen through the coatings with up to 10 wt % glass microsphere beads.

Figure 3:
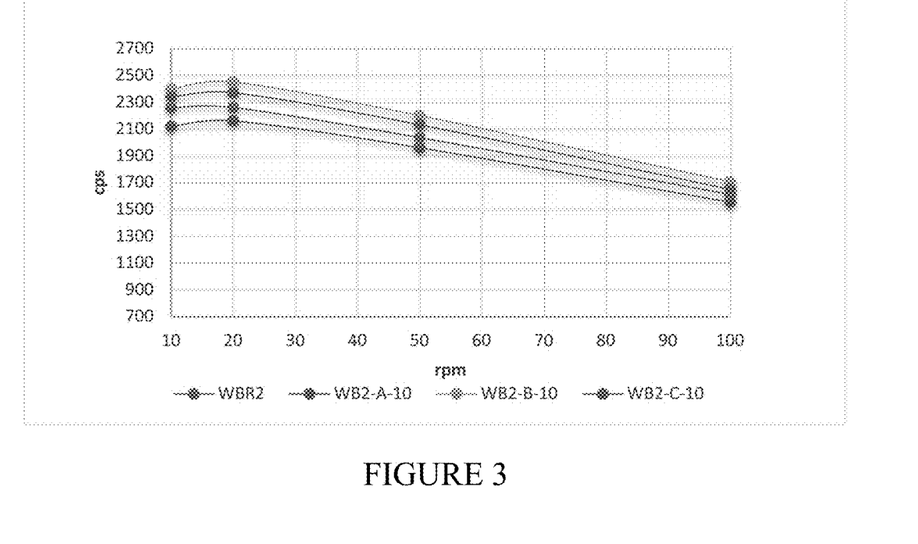
FIG. 3. is a graph showing the effect on shear viscosity of the coating as spherical beads are added to the wood coating.

The addition of glass beads to the wood coating composition does not alter the low shear viscosity of the coating. As shown in FIG. 3, all wood coating recipes with glass beads (Samples WB2-A-10, WB2-B-10, and WB2-C-10) or without glass beads (Sample WBR2) show the same behavior having a sheer thinning effect at higher rotation speed. Initial coating viscosity with typical values between 2000 and 2400 cps at 10 rpm that drop to 1700-1900 cps at 100 rpm.

The addition of glass beads has been found to improve abrasion resistance of the coated wood product. When the plastic beads and wax traditionally used to increase abrasion resistance are replaced with glass microspheres, the coating exhibits similar abrasion resistance or higher abrasion resistance than achieved by the plastic beads and wax. Moreover, in a mar and scratch resistance test, an equal or heavier weight applied to the coating was needed to make a mark on the coating with glass microspheres than on the coating without the microspheres. According to the results of a Taber Abrasion Resistance Test (ASTM 460), the addition of the glass beads to the coating improves the film coating tridimensional structure, causing less abrasion loss.

The addition of glass beads improves the ability of the coating to prevent water stains. After 24 hours exposure to water, the color $\Delta E$ is below 1, which is below the level of visible color. Coatings with glass microspheres have good resistance to water stain.

Applicants have determined that a coating with a glass bead content ranging from 5 wt %-15 wt % provides comparable scratch and stain resistance to conventional wood coating. The properties are best for a coating having approximately 10 wt % glass bead content.

In order to provide a shelf-stable coating, applicants have found that the glass beads or solid glass microspheres must first be pre-dispersed in a paste which is then incorporated into the coating. Applicants have found that this approach limits the amount of settling of the glass beads or solid glass microspheres in the final coating composition.

A shelf-stable paste is first prepared by combining a solution of modified styrene maleic acid copolymer and a synthetic layered silicate. That paste is then mixed with a binder to form the coating. Preferably, the concentration of glass beads in the paste ranges from 60 wt % to 80 wt %, the concentration of solution of modified styrene maleic acid copolymer ranges from 20 wt % to 25 wt % and the concentration of synthetic layered silicate ranges from 1 wt % to 3 wt %.

In one illustrative example, a recipe having a high glass bead loading rate (76.7 wt %) is prepared that has the consistency of a paste and is capable to keep beads in suspension. Glass beads or solid glass microspheres are dispersed in a solution of modified styrene maleic acid copolymer such as Disperbyk® dispersant from BYK. Other dispersants have not been found to provide as good a result, although other dispersants have yet to be tested.

The thixotropy of the paste mixture can be adjusted by combining a synthetic layered magnesium silicate such as Laponite® RD or Macrosorb® MS 10 with the solution of modified styrene maleic acid copolymer, creating a high concentration mix. Alternatively, it may be possible that other synthetic layered silicates such as sodium silicates could also be used.

If desired an anti-foam compound can be added to the paste composition. Suitable anti-foam compounds include BYK 1724 and SCHWEGO 6325. Other foams could also be used if the pH activity range of the anti-foam matches the glass beads pH which is between 8 and 11.

Set forth below in Table 1 are the results of various formulations recipes that applicant has found to provide a suitable paste. These formulations provide a shelf-stable paste. All of these recipes maintained the glass beads in suspension for an extended time period without the paste seizing into a solid block.

TABLE 1

| Recipe | Water | Solution of modified styrene maleic acid copolymer | | Antifoam | | Synthetic layered magnesium silicate | | NP3 | Color | Viscosity |
| --- | --- | --- | --- | --- | --- | --- | --- | --- | --- | --- |
| | | Disperbyk 199 | SCHWEGO wett 8319 | BYK 1724 | SCHWEGO 6325 | Laponite RD | Macrosorb MS10 | | | KU Initial |
| 2.1 | 18.5% | 20.0% | | 0.5% | | 1.0% | | 60.0% | Gray | 60 |
| 2.3 | 5.0% | 20.0% | | 0.5% | | 1.0% | | 76.7% | Gray | >140 |
| 2.3.1 | 5.0% | 20.0% | | 0.5% | | | 1.0% | 73.5% | Gray | 135 |
| 2.12 | 10.0% | 22.0% | | 0.5% | | | 1.5% | 65% | Gray | 120 |

The paste containing the pre-dispersed glass beads or solid glass microspheres is then mixed by the end users (customers) with a binder and other lacquer components such as solvents or water, anti-foam, levelling agents, coalescent, rheological additives and hardeners, into their formulation to give a final coating having a 10% bead loading rate. Such a bead loading rate provides suspension stability for the glass beads as well as improved wear and scratch resistance to the coating.

A comparison of the performance of conventional coatings to polyurethane wood coatings having a glass bead content of 5 wt %, 10 wt %, and 15 wt % prepared in accordance with the process outlined above are set forth in Table 2 below.

TABLE 2

| Bead content | Scratch resistance | Wear resistance | Stain resistance |
| --- | --- | --- | --- |
| Conventional | 1800 g | 0.002 | ΔE 0.75 |
| 5% glass bead | 1400 g | 0.0019 | ΔE 0.55 |
| 10% glass bead | 2400 g | 0.0055 | ΔE 0.60 |
| 15% glass bead | 2000 g | 0.00103 | ΔE 0.37 |

As shown in Table 2, coatings prepared in accordance with the present invention provide comparable scratch, wear, and stain resistance properties to wood products as conventional coatings.

Example 2

In an effort to determine the preferred bead paste formulation and loading, samples of bead pastes containing NP3 glass microspheres were prepared and coded as bead pastes NP3 2.9, NP3 2.10, NP3 2.11, NP3 2.12 and NP3 2.13. The formulations of these pastes are set forth in Table 3 below.

TABLE 3

| Ingredient | Parts | Type of material |
| --- | --- | --- |
| Alberdingk AC2514 | 70 | Acrylic binder |
| Water | 6.3 | |
| Dowanol DPM | 3.5 | Coalescent |
| Dowanol DPNB | 3.5 | Coalescent |
| Mix water and coalescent slowly and add to resin while stirring. Stir for 5 minutes at 1000 rpm. | | |
| BYK 024 | 0.3 | Anti foam agent |
| Dowsil 67 | 0.3 | Wetting agent |

TABLE 3-continued

| Ingredient | Parts | Type of material |
| --- | --- | --- |
| Add while stirring. Mix for 15 minutes at 1000 rpm. | | |
| Rheolate 299 | 0.5 | Thickener |
| Rheolate 350D | 0.3 | Thickener |
| Water | 12.3 | |
| Premix water and thickeners for 16 minutes at 1800 rpm to prevent agglomeration. Add premix to binder while stirring. After addition of the thickener increase stirring speed to 1500 rpm and mix for 20 minutes. | | |
| Water | As required | |

Water added to dilute the formulation to a DIN6 viscosity of 25 ± 2 s.

The difference in the formulations for the bead pastes is the amount of NP3 glass microspheres in each formulation. The weight load of the glass beads in the various samples is set forth in Table 4 below.

TABLE 4

| | NP3 2.9 | NP3 2.10 | NP3 2.11 | NP3 2.12 | NP3 2.13 |
| --- | --- | --- | --- | --- | --- |
| Weight percent of NP3 glass beads | 68.0 | 66.0 | 68.0 | 66.0 | 64.5 |

The bead pastes were added to give a 10% bead loading into a water-based acrylic 1K formulation, based on Alberdingk AC2514 resin. The bead paste addition required to give 10% bead loading are set forth in Table 5 below.

TABLE 5

| | NP3 2.9 | NP3 2.10 | NP3 2.11 | NP3 2.12 | NP3 2.13 |
| --- | --- | --- | --- | --- | --- |
| Bead paste addition to provide 10% loading | 14.71 | 15.15 | 14.71 | 15.15 | 15.50 |

The formulations were prepared using a Dispermat mixer fitted with a cowles head blade. Different mixing conditions (varying speed and time) were used to incorporate one of the bead pastes to determine the optimal mixing conditions to prepare the formulations.

The formulations were coated onto leneta cards and wooden panels at 100 μm wet film thickness, using a wire bound k-bar and allowed to dry overnight.

Gloss at 60° and 80° (sheen) and L*, a*, b* were measured using the tri micro glossmeter and X-Rite spectrodesitometer respectively.

After 7 days, scrub abrasion resistance and water stain resistance were measured on the coated cards and scratch/mar resistance was measured on the wooden panels.

The effect of mixing conditions on the quality of the coating was studied at selected mixing conditions. As shown in Table 6, increasing the mixing time and/or the speed had no observable beneficial effect on the quality of the coating.

TABLE 6

| | Mixing conditions (time in minutes/speed rpm) | | | |
|---|---|---|---|---|
| | 5/1000 | 10/1000 | 5/2000 | 5/3000 |
| Observations | Very gritty | Very gritty | Very gritty | Very gritty |

The coating quality was studied. As shown in Table 7, below, bead pastes NP3 2.9, NP3 2.10 and NP3 2.12 produced very gritty coatings. Bead paste NP3 2.12 gave the best coating, which was very slightly gritty. A slightly more gritty coating was achieved from bead paste NP3 2.11.

TABLE 7

| Substrate | No silica | NP3 2.9 | NP3 2.10 | NP3 2.11 | NP3 2.12 | NP3 2.13 |
|---|---|---|---|---|---|---|
| Card | OK | Very gritty | Very gritty | Slightly gritty | Very slightly gritty | Very gritty |
| Wood | OK | Very gritty | Very gritty | Slightly gritty | Very slightly gritty | Very gritty |

Figure 10:
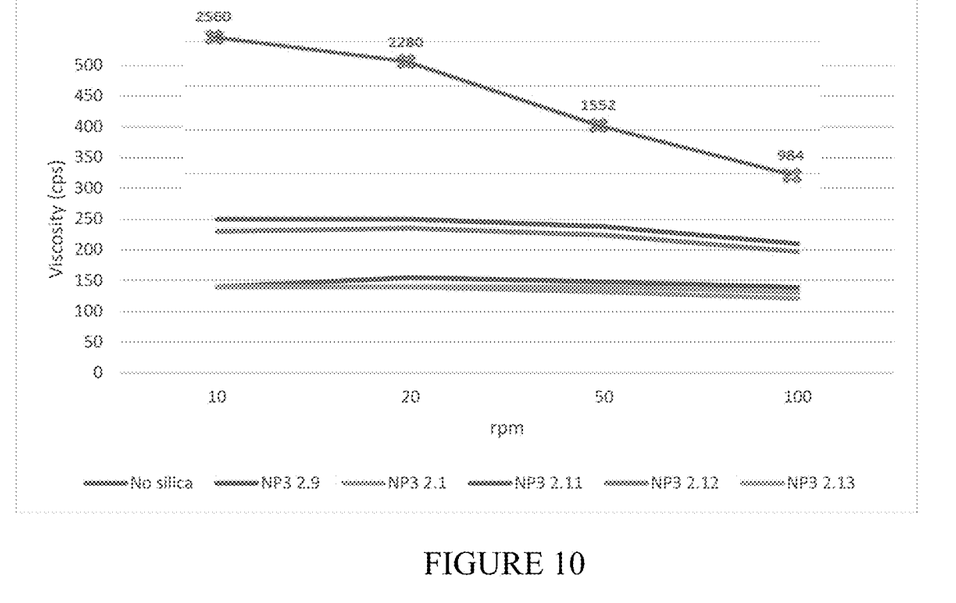
FIG. 10. is a graph showing the Brookfield viscosity for a variety of bead pastes.
Figure 11:
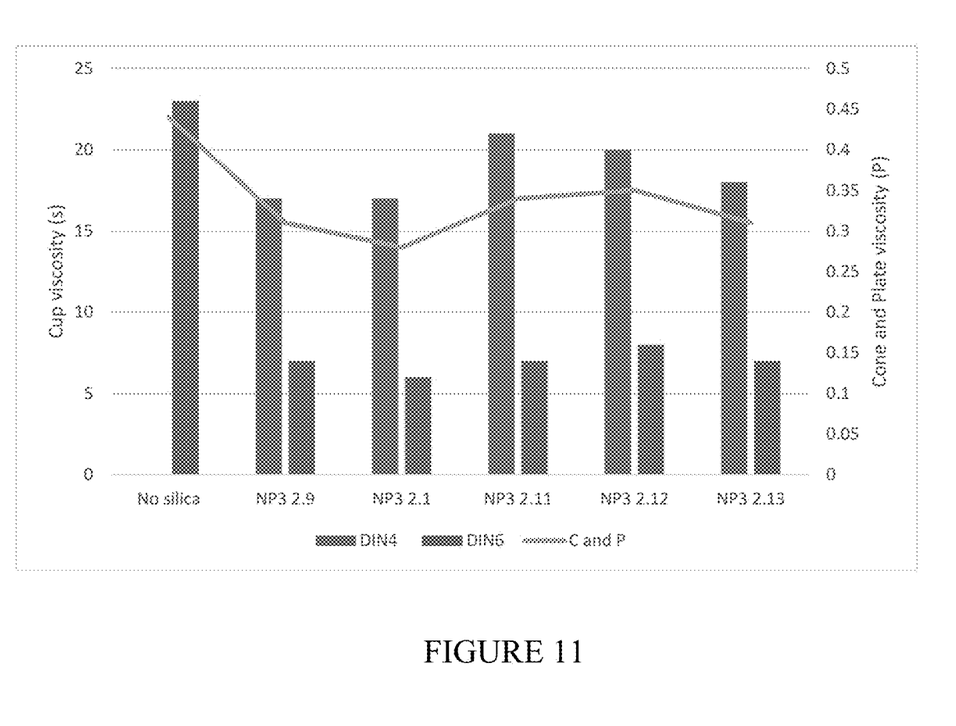
FIG. 11 is a graph showing the DIN4, DIN6, and Cone and Plate viscosities for a variety of bead pastes.

As shown in FIGS. 10 and 11, bead paste addition caused a large reduction in Brookfield (low shear) and cup viscosity. Similar trends were seen from the high shear Cone and Plate viscosity in FIG. 8, although this was slightly less affected by bead paste addition. Bead pastes NP3 2.11 and NP3 2.12 gave the highest (best) viscosities, showing the lowest drop in viscosity on addition to the Alberdingk acrylic base. Similar, lower viscosities were measured for all of the other bead pastes.

Figure 15:
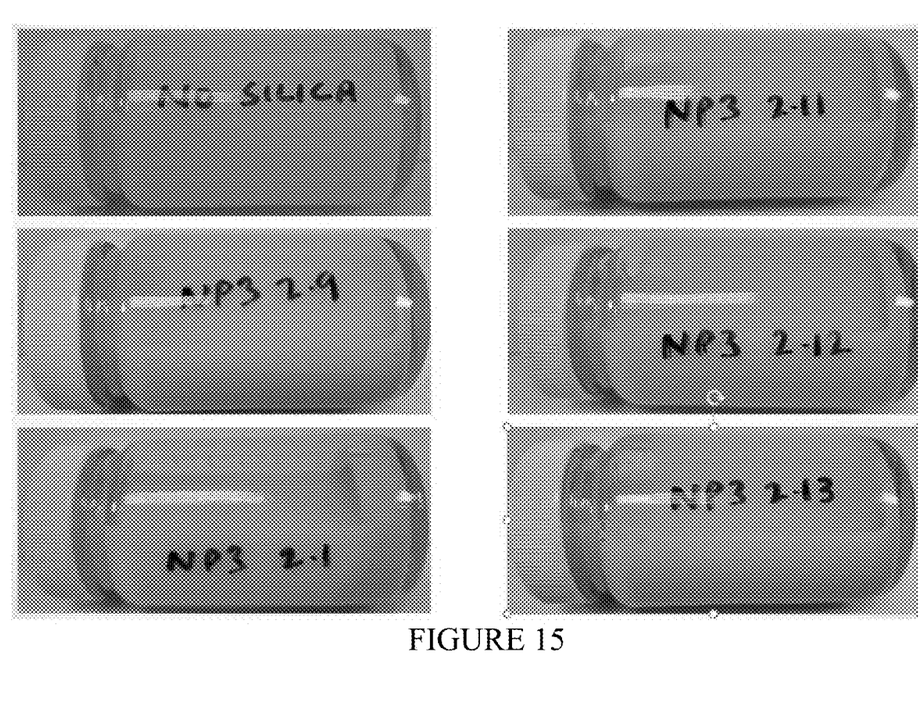
FIG. 15. is a series of photographs showing the sedimentation for a variety of bead pastes.

All of the samples containing bead pastes showed sedimentation. As shown in FIG. 15, this was especially significant for bead paste NP3 2.10. The sedimentation was soft and easily redispersed for all samples.

Figure 4:
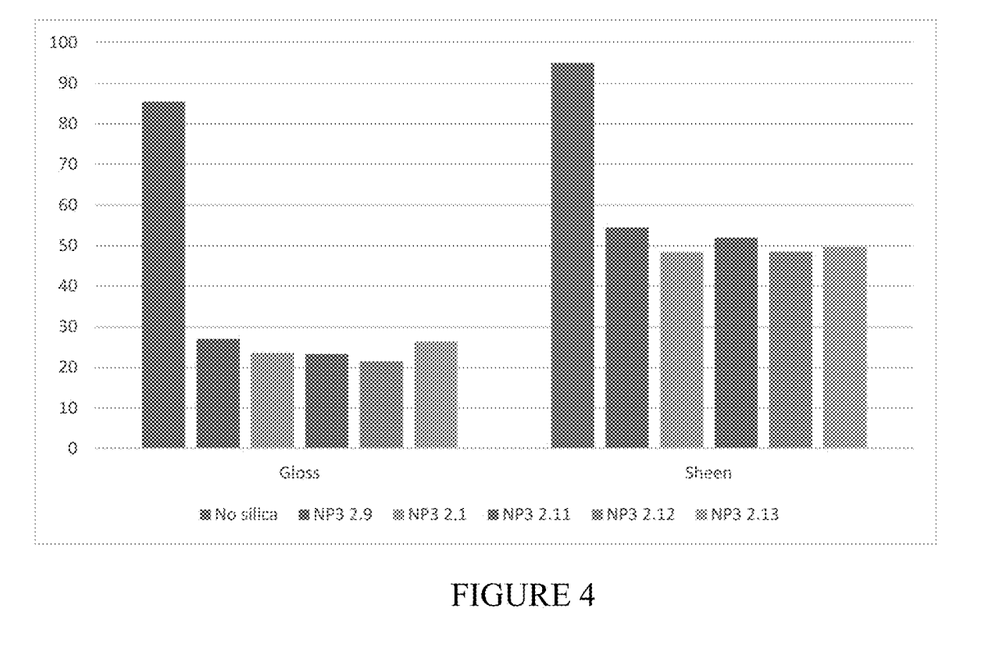
FIG. 4. is a graph showing the matting efficiency on a card for a variety of bead pastes.
Figure 5:
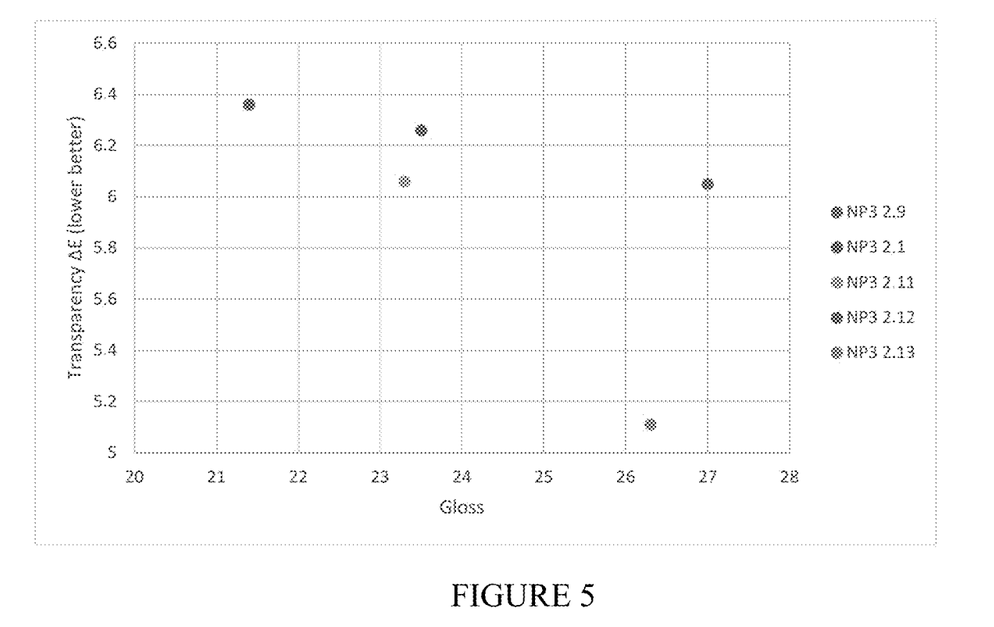
FIG. 5. is a graph showing the ΔE transparency on card for a variety of bead pastes.

The addition of the glass bead pastes to the formulation resulted in gloss reduction in the coated cards. As shown in FIG. 4, the best matting efficiency was seen from bead pastes NP3 2.12; NP3 2.9 and NP3 2.13 which exhibited the lowest gloss reduction. As shown in FIG. 5, the best transparency was exhibited by bead paste NP3 2.13, but this was coupled with higher gloss. Of the cards with the lower gloss, bead paste NP3 2.11 gave the best transparency.

Figure 6:
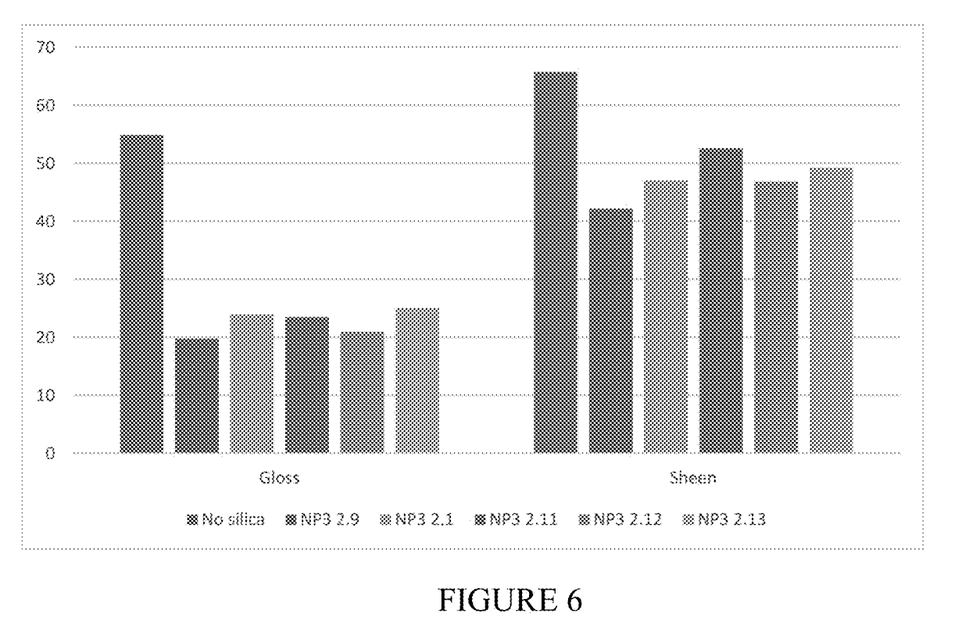
FIG. 6. is a graph showing the matting efficiency on wood for a variety of bead pastes.
Figure 7:
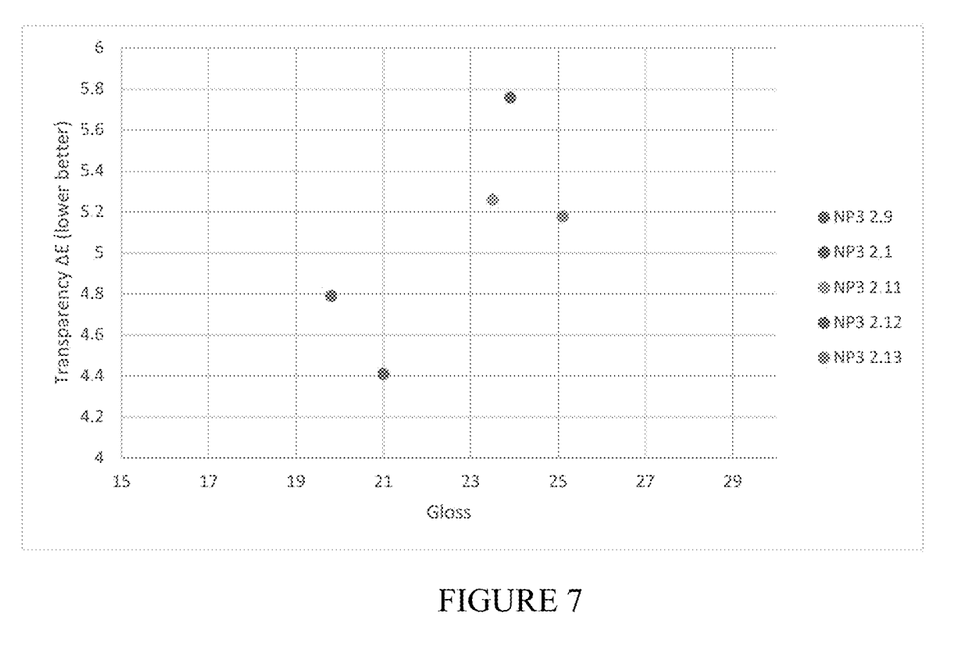
FIG. 7. is a graph showing the ΔE transparency on card for a variety of bead pastes.
Figure 8:
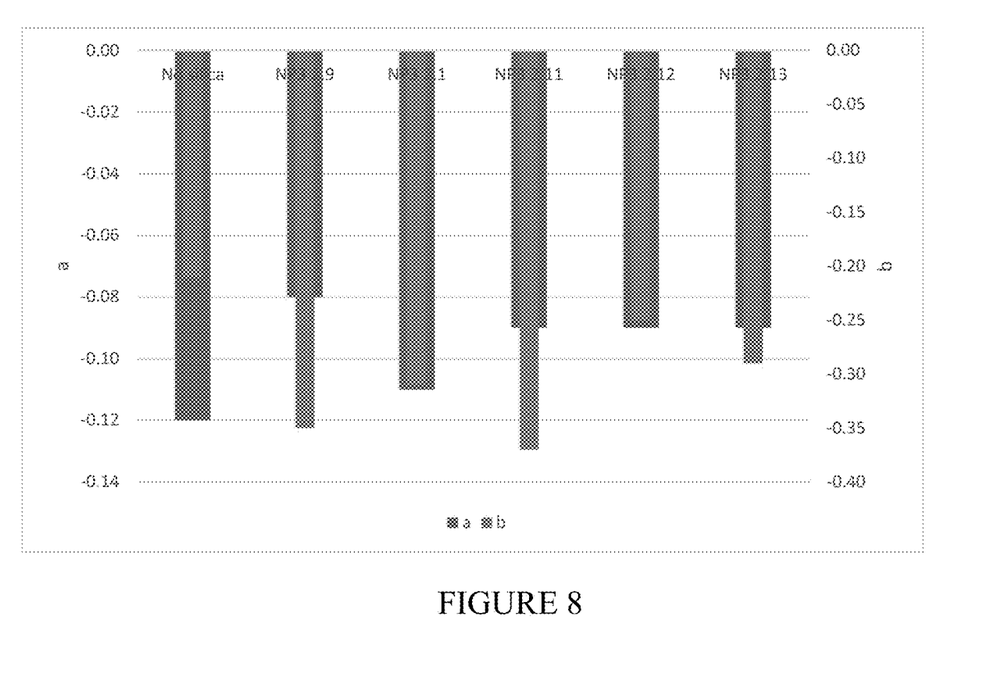
FIG. 8. is a graph showing the color (a,b) on card for a variety of bead pastes.
Figure 9:
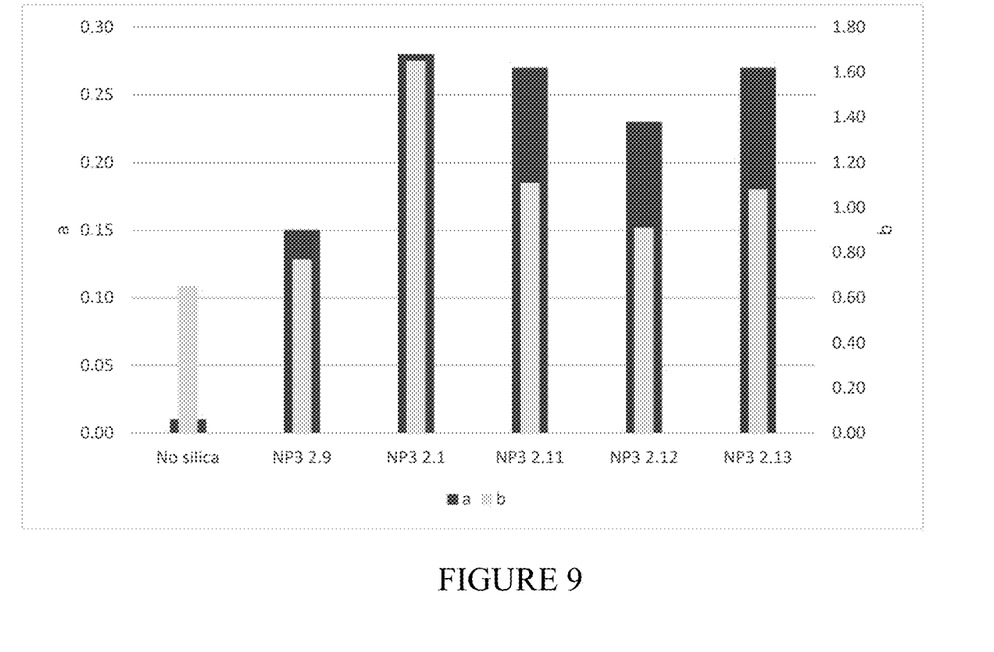
FIG. 9. is a graph showing the color (a,b) on card for a variety of bead pastes.

As shown in FIG. 8, the addition of glass bead pastes increased the redness and blueness of the coated cards. Bead paste NP3 2.10 produced the greenest cards and bead paste NP3 2.11 gave the bluest cards The addition of the glass bead pastes to the formulation resulted in gloss reduction in the coated panels. As shown in FIG. 6, bead paste NP3 2.9 gave the best gloss reduction. The poorest matting efficiency was seen from bead paste NP3 2.13. As shown in FIG. 7, the best transparency/low gloss combination was exhibited by bead pastes NP3 2.9 and NP3 2.12. As shown in FIG. 9, the addition of glass bead pastes increased the redness and yellowness of the coated panels. Bead paste NP3 2.10 produced the most red and yellow panels.

Figure 12:
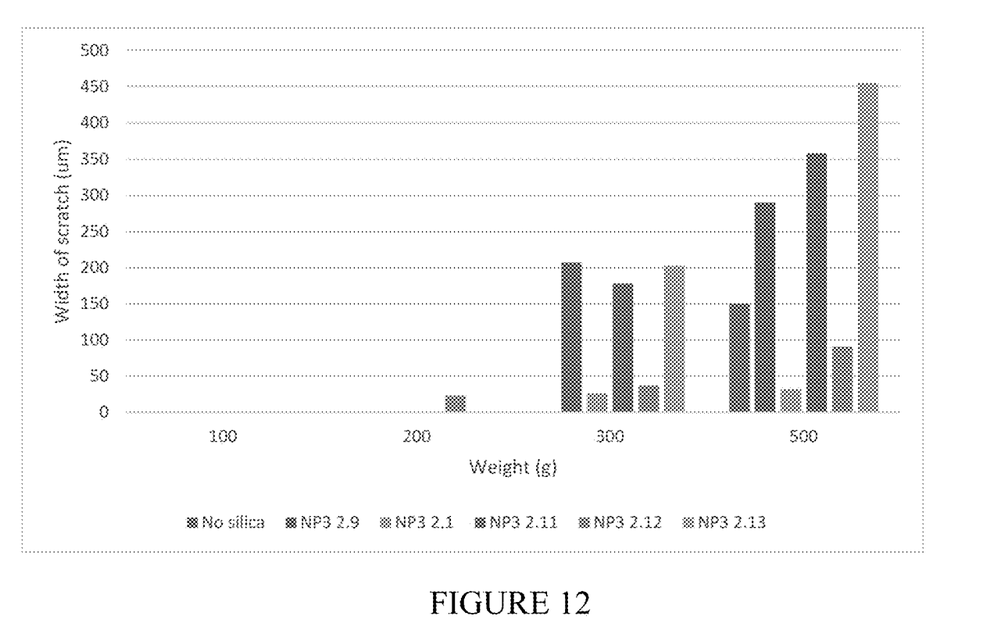
FIG. 12 is a graph showing the scratch/mar resistance on wooden panels for a variety of bead pastes.

The addition of bead pastes to the formulation was found to have a detrimental effect to scratch/mar resistance at weights below 500 g. As shown in FIG. 12, no visible scratch/mar was observed in any of the panels at 100 g weight and only extremely slight mar in the use of bead paste NP3 2.12 at 200 g. The best scratch/mar resistance was seen from the use of bead paste NP3 2.10, which gave the thinnest scratch at the higher weights, closely followed by bead paste NP3 2.12. The remaining three formulations had significantly worse scratch/mar resistance, with considerably thicker scratches. Bead paste NP3 2.13 had the poorest scratch/mar resistance overall.

Figure 13:
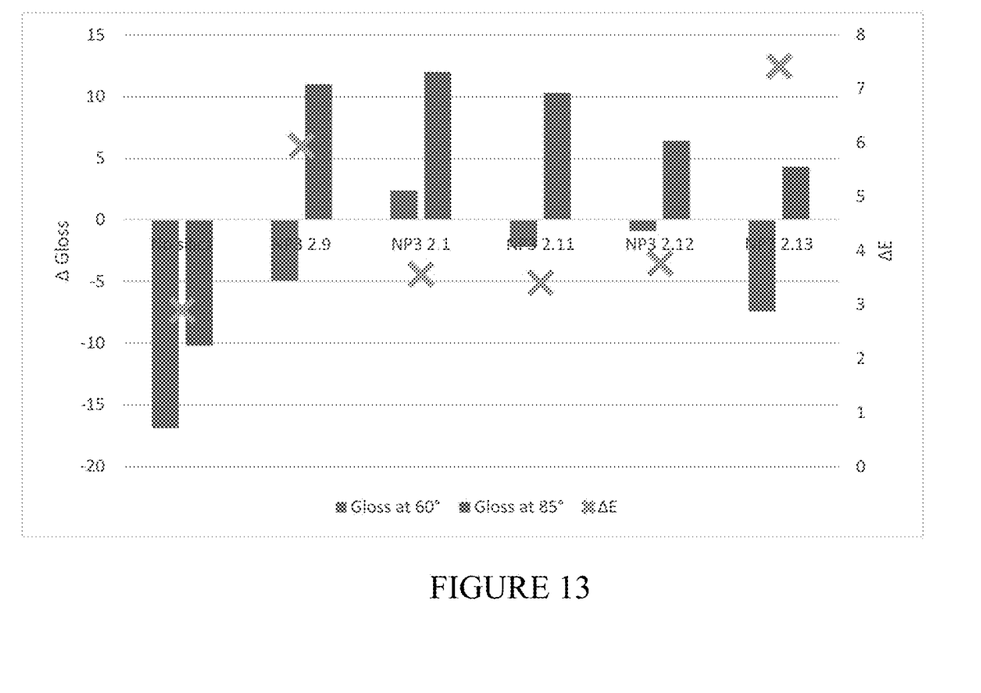
FIG. 13. is a graph showing the scrub abrasion for a variety of bead pastes.

The addition of bead paste had a positive effect on scrub abrasion, as determined by change in gloss at 60°, with all panels containing bead pastes showing less change after abrasion than the panel with no bead paste. As shown in FIG. 13, bead paste NP3 2.13 showed the most change in gloss at 60° and NP3 2.11 and 2.12 were least affected. The addition of bead paste changed the effect of scrub abrasion on gloss at 85°, with panels containing bead paste showing a polished effect (positive delta gloss), rather than an abraded outcome (negative delta gloss) as seen in the panel containing no bead paste. Bead paste NP3 2.13 showed the least change in gloss at 85°.

As shown in FIG. 13, for the scrub abrasion resistance, as determined by ΔE, addition of bead paste had a detrimental effect, with panels containing bead pastes giving a larger color change after abrasion. Bead paste NP3 2.13 had the least resistance to scrub abrasion, as determined by ΔE; NP3 2.10, NP3 2.11 and NP3 2.12 gave the best resistance.

Figure 14:
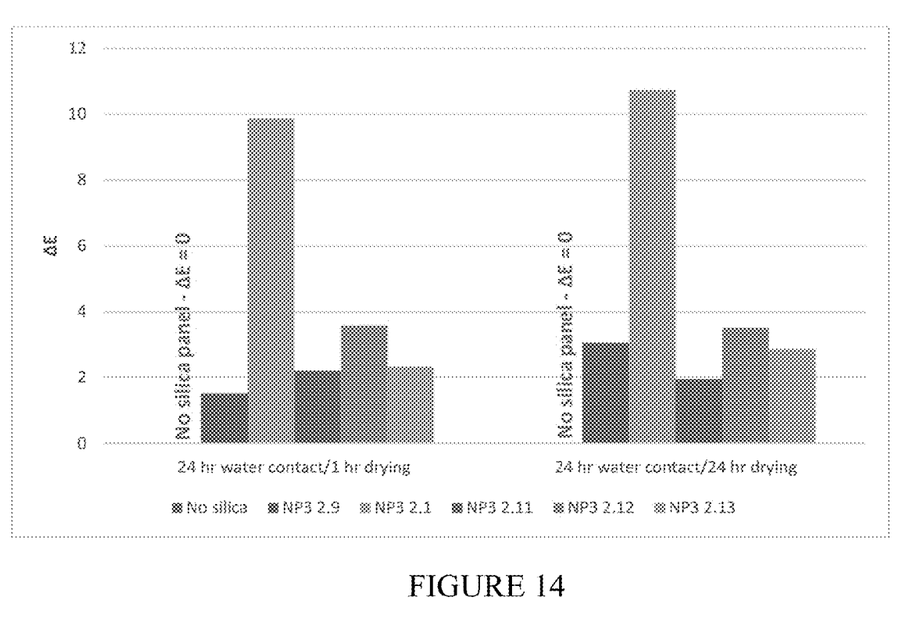
FIG. 14. is a graph showing the water stain resistance for a variety of bead pastes.

As shown in FIG. 14, all of the coated panels containing bead pastes showed visible staining; significantly worse staining was seen in cards with bead paste NP3 2.10. The best resistance to water staining was from bead paste NP3 2.11 (Graph 11).

Based on the tests described above, bead paste NP3 2.12 was found to be the overall best formulation.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the endpoints.

We claim:

1. A process for forming a shelf-stable coating for wood products comprising the steps of:
   a) forming a shelf-stable paste, said shelf-stable paste comprising glass beads, a polyether-based dispersant, and synthetic layered silicate; and
   b) mixing said shelf-stable paste with a binder to form said shelf-stable coating
wherein the concentration of glass beads in said shelf-stable paste ranges from 60 wt % to 79 wt %, the concentration of polyether-based dispersant in said shelf-stable paste ranges from 20 wt % to 25 wt % and the concentration of synthetic layered silicate in said shelf-stable paste ranges from 1 wt % to 3 wt %.

2. The process of claim 1, wherein said shelf-stable coating contains between 5 wt % and 15 wt % glass beads.

3. The process of claim 2, wherein said shelf-stable coating contains 10 wt % glass beads.

4. A process for forming a shelf-stable coating for wood products comprising the steps of:

a) forming a paste pre-mix, said paste pre-mix comprising a polyether-based dispersant and synthetic layered silicate;
b) dispersing glass beads in said paste pre-mix to form a shelf-stable paste; and
c) mixing said shelf-stable paste with a binder to form said shelf-stable coating wherein the concentration of glass beads in said shelf-stable paste ranges from 60 wt % to 79 wt % the concentration of polyether-based dispersant in said shelf-stable paste ranges from 20 wt % to 25 wt % and the concentration of synthetic layered silicate in said shelf-stable paste ranges from 1 wt % to 3 wt %.

5. The process of claim 4, wherein said shelf-stable coating contains between 5 wt % and 15 wt % glass beads.

6. The process of claim 5, wherein said shelf-stable coating contains 10 wt % glass beads.

7. A process for forming a shelf-stable paste for use in a shelf-stable coating for wood products comprising the step of mixing glass beads, a polyether-based dispersant, and synthetic layered silicate to form a shelf-stable paste, wherein the concentration of glass beads in said shelf-stable paste ranges from 60 wt % to 79 wt %, the concentration of polyether-based dispersant in said shelf-stable paste ranges from 20 wt % to 25 wt % and the concentration of synthetic layered silicate in said shelf-stable paste ranges from 1 wt % to 3 wt %.

* * * * *